W. C. CHAMBERLAIN.
Rotary Churn-Dasher.

No. 164,143. Patented June 8, 1875.

Witnesses:
Jas. Martin Jr.
J. N. Campbell

Inventor:
William C. Chamberlain
by
Mason, Fenwick & Lawrence
Attys

THE GRAPHIC CO. PHOTO-LITH. 39 & 41 PARK PLACE, N.Y.

UNITED STATES PATENT OFFICE.

WILLIAM C. CHAMBERLAIN, OF DUBUQUE, IOWA.

IMPROVEMENT IN ROTARY CHURN-DASHERS.

Specification forming part of Letters Patent No. 164,143, dated June 8, 1875; application filed March 22, 1875.

*To all whom it may concern:*

Be it known that I, WILLIAM C. CHAMBERLAIN, of Dubuque, county of Dubuque and State of Iowa, have invented a new and Improved Dasher for Churns; and I do hereby declare that the following is a full, clear, and exact description thereof, reference being had to the accompanying drawing, making part of this specification, in which—

Figure 1:
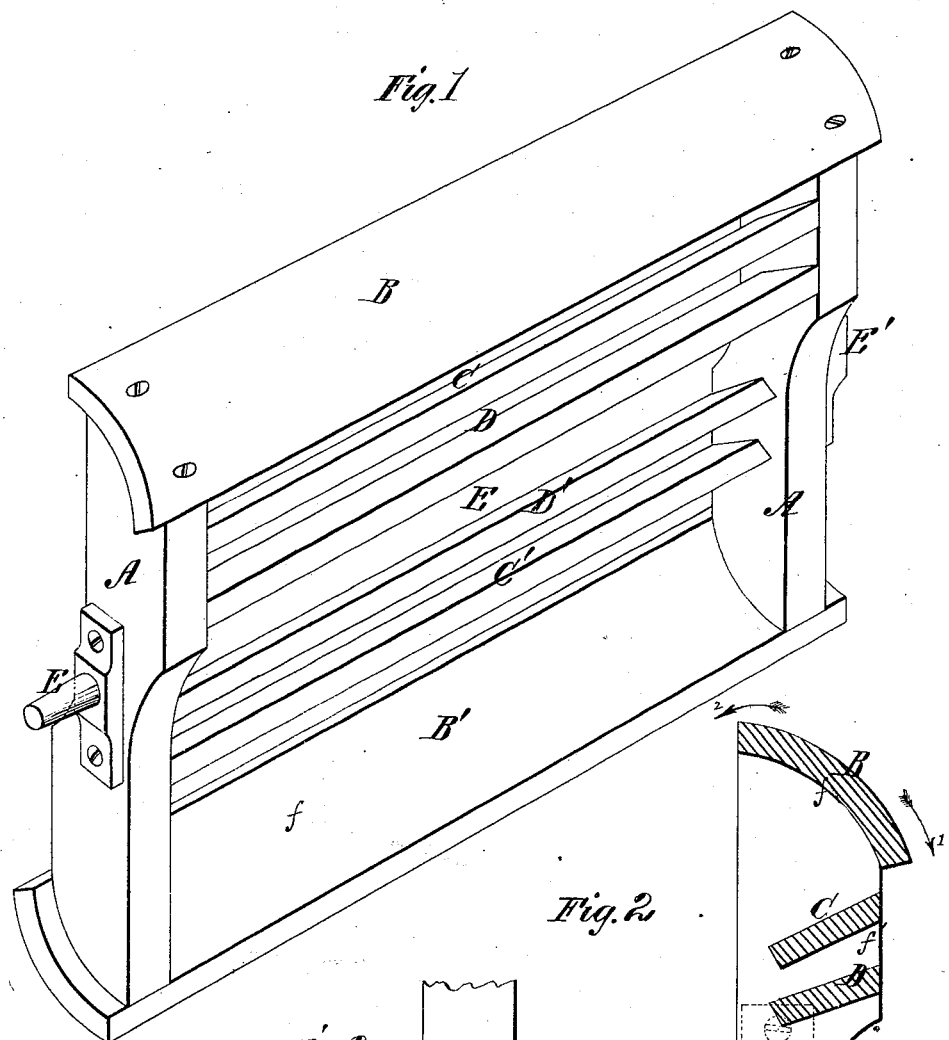
Figure 3:
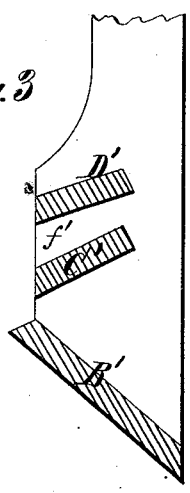
Figure 2:
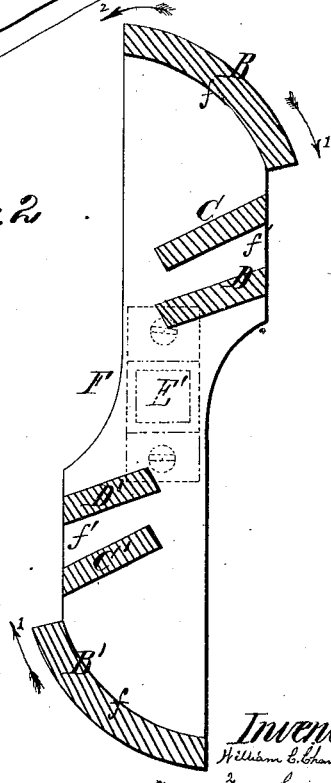

Figure 1 is a perspective view of the agitating and gathering dasher; Fig. 2, a vertical transverse section of the same. Fig. 3 is a transverse section, showing a portion of the agitator and gatherer, the same being slightly modified in form.

The nature of my invention consists in a churn-dasher, constructed and operating as hereinafter described, for churning milk or cream into butter, and gathering the butter while in the buttermilk into lumps or rolls.

My dasher is formed of two transverse end pieces, A A, and six longitudinal strips, B B' C C' D D'. On one of the end pieces a short axial journal, E, is provided, and on the other a metal box, E', with a square socket in it, is fastened. The journal and socketed box are of usual construction, and serve the ordinary purpose. On each side of the center or axis of the dasher and gatherer proper, three strips, B C D, are arranged, so that a broad space, F, is left between the respective sets of strips. This space allows a large volume of cream or milk to circulate centrally through the dasher. The end strips partake somewhat of the form of the letter S, and upon the outer extremities of these end pieces strips B B', which are curved, are set so that their concave sides stand opposite each other. Instead of making these strips curved they may be flat and set against a beveled surface of the end pieces, as shown in Fig. 3. Between these pieces B B' the strips C D and C' D' are set; those C D, which are flat, are placed on one side of the center of the dasher proper, so as to stand in a reverse angle to the strips B B', as indicated in Fig. 3, or to diverge from the face of the strips B B', shown in Fig. 2; and the faces of these strips are not parallel to one another, but are made to diverge slightly from each other, from the gathering side of the dasher proper toward the agitating side.

The other pair of strips, C' D', which also are flat, are arranged in the same relation to their strip B' and to one another that the strips C D are arranged to their strip B, as shown in Fig. 2 of the drawing. Thus it will be seen that ladles or approximately V-shaped chambers, open at front and rear, are formed by the strips B and B' and the strips C C'; and also that gradually-widening channels *f' f'* are formed between the respective pairs of strips C D C' D'.

By constructing the dasher as shown, a very effective agitator for the cream is secured when the dasher is revolved in the direction of the arrow 1, the cream being beaten, squeezed, and broken by the strips B C D and B' C' D', and a free circulation afforded between these strips; and when the dasher is revolved in a reverse direction, as indicated by arrow 2, the butter is rapidly and perfectly gathered by the ladles formed by the strips B C B' C'. During the gathering operation any small lumps of butter which may be sticking between the blades C D and C' D' will be forced out and their escape facilitated by the gradually widening of the channels *f*, which are between the strips.

What I claim is—

1. The combination, in a dasher, of the end pieces A and the permanent strips B C D, constructed, arranged, and operating as described.

2. The dasher, having the strips B C and the strips B' C' arranged permanently upon its end pieces in the relation to one another as shown, for the purpose of gathering butter after the operation of churning, substantially as set forth.

3. The dasher, having the strips B C D and the strips B' C' D' arranged upon its end pieces in the relation to one another as shown, for the purpose of both agitating and gathering butter, substantially as described.

4. The dasher, with strips C D diverging from one another toward the agitating side of the dasher for the purpose of facilitating the escape of small lumps of butter, substantially as described.

W. C. CHAMBERLAIN.

Witnesses:
TRUMAN H. BOWEN,
EDWARD T. OTHY.